United States Patent
Rao

(10) Patent No.: US 6,838,066 B2
(45) Date of Patent: Jan. 4, 2005

(54) PROCESS FOR RECOVERY, PURIFICATION, AND RECYCLE OF ARGON

(75) Inventor: Madhukar Bhaskara Rao, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 213 days.

(21) Appl. No.: 10/243,153

(22) Filed: Sep. 13, 2002

(65) Prior Publication Data

US 2004/0052708 A1 Mar. 18, 2004

(51) Int. Cl.[7] ............................. C01B 23/00; F25J 3/08; F25J 5/00
(52) U.S. Cl. ........................... 423/262; 62/632; 62/636; 62/924
(58) Field of Search ............................. 423/262; 62/632, 62/636, 924

(56) References Cited

U.S. PATENT DOCUMENTS

| 5,106,399 A | 4/1992 | Fisher | 62/22 |
| 5,204,075 A * | 4/1993 | Jain et al. | 423/219 |
| 5,706,674 A | 1/1998 | Hsiung et al. | 62/632 |
| 6,113,869 A | 9/2000 | Jain et al. | 423/219 |
| 6,123,909 A | 9/2000 | Yamamoto et al. | 423/210 |

OTHER PUBLICATIONS

JP 489387, Japan.
JP 624962, Japan.
JP 733581, Japan.

* cited by examiner

Primary Examiner—Stanley S. Silverman
Assistant Examiner—Jonas N. Strickland
(74) Attorney, Agent, or Firm—Rosaleen P. Morris-Oskanian

(57) ABSTRACT

A method and system for the purification and recycle of impure argon is disclosed. The system and process of the present invention can produce very high purity argon, i.e., about 1 ppb or less of impurities. In one embodiment of the invention, a cryogenic separation apparatus is used to remove the nitrogen, hydrocarbon, and hydrogen impurities from the argon stream. A catalyst bed is then operated at ambient temperature to remove hydrogen, oxygen, and carbon monoxide impurities to provide the purified argon product. Also disclosed is a method to minimize to loss of the purified argon product during regeneration of the catalyst bed.

14 Claims, 1 Drawing Sheet

PROCESS FOR RECOVERY, PURIFICATION, AND RECYCLE OF ARGON

BACKGROUND OF THE INVENTION

The present invention relates generally to a method for the recycle of argon. More specifically, the present invention relates generally to a method for the recovery, purification, and recycle of argon, for example, from high temperature furnaces such as silicon crystal growth furnaces.

Argon may be employed in various processes wherein its chemically inert nature, specific physical properties, and cost, which may be lower relative to other inert gases, makes its use particularly advantageous. Argon may be used as a blanketing gas, a purge gas, or a heat transfer medium. For example, high-purity argon (Ar), having less than about 1 ppb impurities, may be used as the inert gas within a high temperature, silicon crystal growth furnace.

Silicon substrates used in the production of semiconductors are typically manufactured in a two-step process such as the Czochralski method. In the first step or forming step, large single crystals of silicon are grown in a high temperature furnace by heating silicon in an argon atmosphere. A seed of silicon is dipped into molten silicon and slowly withdrawn. As the seed is withdrawn, a large ingot of single-crystal silicon is formed onto the crystal seed. Dopants such as arsenic, phosphorous, or boron may be added to either the molten silicon or to the argon purge stream to add trace levels of impurities to the crystals in order to alter the electronic properties of the crystal. In the second or finishing step, the silicon crystal may be cooled under an argon atmosphere to ambient temperature to form an ingot. The ingot is polished and then sliced into wafers for further processing.

The argon effluent from the high temperature furnace may contain trace levels of volatile dopants, oxygen, nitrogen, carbon oxides (i.e., CO, $CO_2$), hydrogen, and hydrocarbons (i.e., $CH_4$, $C_2H_4$, $C_3H_6$, etc.). Because the utilization of argon is large and the availability of argon on the commercial market may be modest, various attempts to reutilize the argon have been identified in the prior art. Each of these attempts has tried to overcome the problem of taking the contaminated, impure argon effluent from the furnace and treating it to remove particulates, dopants, and/or other impurities, typically in the form of gases, for recycle of acceptably pure argon for reuse in the silicon crystal furnace. A key criterion for the recovery and purification of such argon is that the process be competitive with the commercial costs of fresh argon from the industrial gas market.

U.S. Pat. No. 5,106,399 describes an argon purification system. The impure argon is first passed through a molecular sieve adsorbent bed to remove water vapor and carbon dioxide. The dehydrated, impure argon is then passed through a bed of catalytic material to chemisorb oxygen, hydrogen, and carbon monoxide. Lastly, the argon is passed through an adsorbent bed at cryogenic temperatures to adsorb nitrogen and hydrocarbons before recovering a purified argon stream for reuse. The '399 patent, however, does not specifically address how the dopant materials are removed from the argon stream. Further, a portion of the purified argon may be lost during the regeneration cycle.

U.S. Pat. No. 5,706,674, assigned to the assignee of the present invention, describes a process for recovery of argon from silicon crystal furnaces. The impure argon is recovered from the furnace and compressed to an elevated pressure. The argon is then passed through a scrubber to remove any dopant compounds contained therein. Next, the impure argon is passed through a deoxygenation unit with hydrogen, if needed, to reduce the oxygen concentration and produce water and $CO_2$. The impure argon is then passed through a molecular sieve drier to remove water and $CO_2$. Lastly, the argon is purified using cryogenic separation, either distillation or adsorption, to remove oxygen, $H_2$, CO, and trace hydrocarbons.

U.S. Pat. No. 6,123,909 describes a process for purifying Ar contaminated with CO, $O_2$, $N_2$, and methane. Air or oxygen is added to the impure argon and the combined stream is passed across a catalyst bed that selectively oxidizes the CO but not the methane contained therein to form $CO_2$. Hydrogen gas is then added to the stream to selectively react with oxygen over a catalyst to form $H_2O$. The argon stream is then passed over an adsorbent to remove the $CO_2$ and $H_2O$ by-products of the prior steps. The resulting gas stream is then cooled to cryogenic temperatures and fed to a distillation column to remove the $N_2$, $H_2$ and methane from the argon stream. Like the '399 patent, the '909 patent does not discuss the removal of dopants from the argon gas stream.

U.S. Pat. No. 6,113,869 describes a process to purify an Ar stream contaminated with $H_2$, CO, water vapor, $O_2$, $CO_2$, $N_2$ and methane. The argon stream is first dried using a dessicant to remove water vapor. The stream then contacts an oxidation catalyst in the presence of excess oxygen, if needed, to completely react the CO and $H_2$ to form $CO_2$ and $H_2O$. The resulting stream is passed over an adsorbent to remove the $CO_2$ and water produced in the prior step. The excess oxygen added in the previous step is removed by contacting the stream with a metal catalyst at temperatures greater than approximately 75° C. Lastly, the nitrogen and methane within the argon stream is removed by cryogenic adsorption. Like the '399 and '909 patents, there is no discussion of dopant removal in the '869 patent.

Japanese Published Patent Application No. 4-89387 describes a process for purifying argon from a silicon crystal furnace in which the gas is removed from the furnace using a vacuum pump. Any particles contained within the gas are removed by filtering the pump inlet. The gas is then passed to a pressure swing adsorption bed containing a zeolite molecular sieve to remove carbon monoxide, nitrogen, and carbon dioxide. The resultant gas stream is then passed to a palladium catalyst to convert oxygen to water and then to an additional adsorption system to dry the gas.

Japanese Published Patent Application No. 7-33581 describes a process for purifying argon from a silicon crystal furnace in which the gas is removed from the furnace using a vacuum pump. The resultant gas is passed to a catalyst to convert carbon monoxide, hydrogen and oxygen to carbon dioxide and water. The resultant gas stream is then sent to an adsorption system to remove carbon dioxide and water.

Japanese Published Patent Application No. 6-24962 describes a multi-step process for purifying argon from a crystal-pulling furnace. Impure argon is passed to a venturi scrubber to remove particulates and then passed to a series of catalyst and adsorption beds. The argon gas is then passed to a bed of de-oxo catalyst to remove oxygen. Next, the gas is sent to a bed of cupric oxide catalyst to convert carbon monoxide and hydrogen within the gas to carbon dioxide and water. The water and carbon dioxide are then removed in a zeolite adsorption bed. Lastly, nitrogen is removed in a low-temperature sorption bed.

Accordingly, there is a need in the art to provide a method for the recovery, purification, and recycle of high purity argon from a silicon crystal furnace. There is a need in the art for a process to remove dopants, as well as other impurities, from an argon gas stream. There is also a need in the art for a cost-effective process to minimize the loss of argon within the purification process. Lastly, there is a need in the art for a process that minimizes capital equipment costs such as the costs of procuring and maintaining relatively large cryogenic units or catalyst beds.

All references cited herein are incorporated herein by reference in their entirety.

BRIEF SUMMARY OF THE INVENTION

Figure 1:
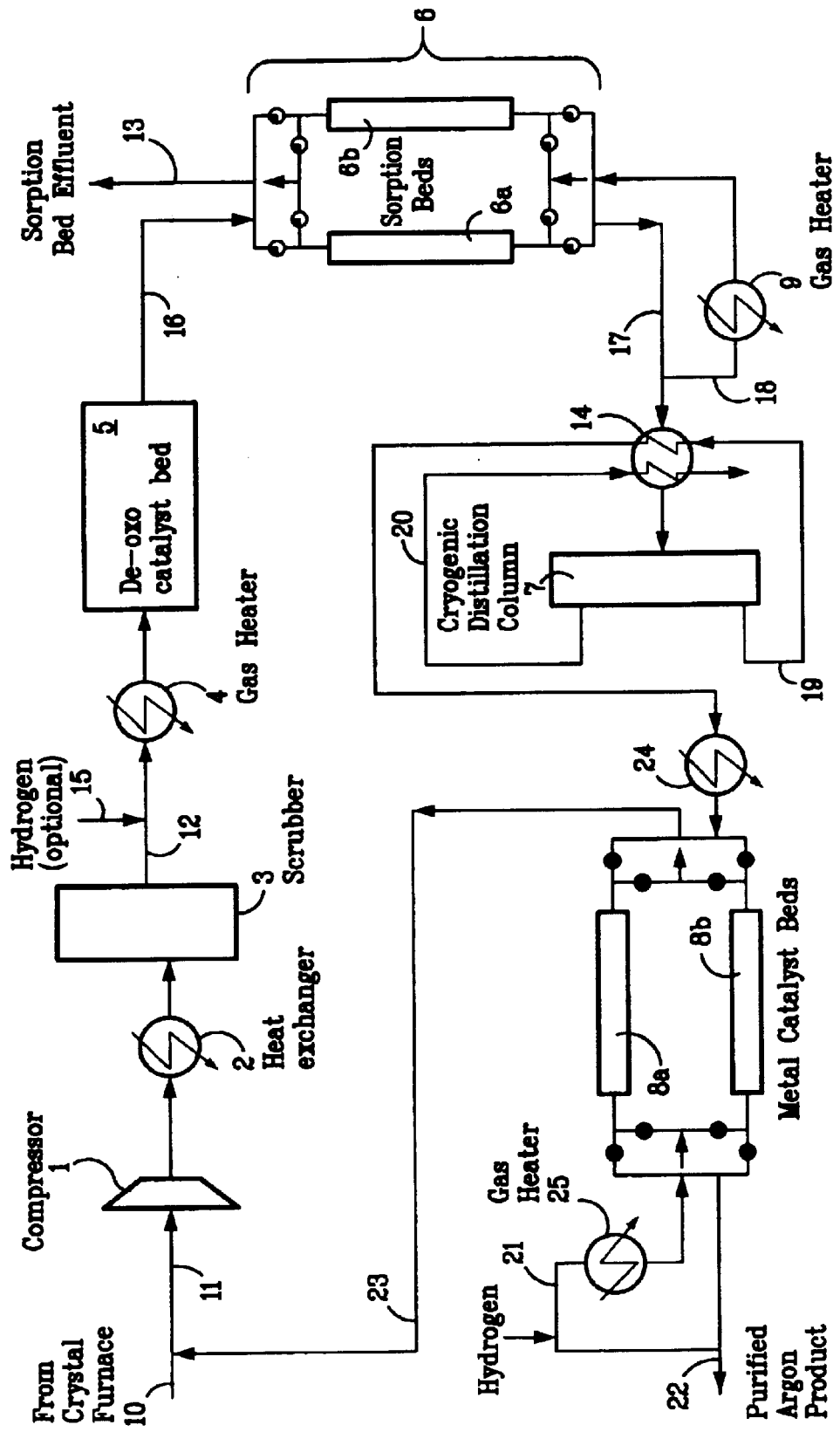
FIG. 1 provides a schematic illustration of one embodiment of the present invention to recover, purify, and recycle argon from a silicon crystal growth furnace.

The present invention satisfies one, if not all, of these needs in the art by providing a relatively economical process for the recovery, purification, and recycle of argon. Specifically, in one embodiment of the present invention, there is provided a method for the purification of argon comprising the following steps: providing an impure argon stream comprising oxygen, nitrogen, carbon monoxide, carbon dioxide, water, hydrocarbons, and dopants; treating the impure argon stream to substantially remove the dopants contained therein; contacting the impure argon stream with a deoxygenation catalyst to substantially remove the oxygen contained therein; contacting the impure argon stream with one of a plurality of adsorbent beds to selectively adsorb carbon dioxide and water from the impure argon stream; separating the impure argon stream in a cryogenic temperature separation apparatus to provide a partially purified argon stream comprising oxygen, carbon monoxide, and hydrogen impurities and an effluent stream comprising nitrogen, hydrocarbons, and hydrogen; and passing the partially purified argon stream comprising oxygen, carbon monoxide, and hydrogen impurities through one of a plurality of metal catalyst beds to remove the impurities and provide a purified argon product wherein the passing step is conducted at an ambient temperature.

In a further embodiment of the present invention, there is provided a system for the purification of argon from a silicon crystal growth furnace. The system comprises a scrubber that is in fluid communication with the silicon crystal growth furnace and that strips the dopants from the impure argon stream at an ambient temperature; a deoxygenation catalyst bed that is in fluid communication with the first adsorbent and substantially removes the oxygen from the impure argon stream; a plurality of adsorption beds that are in fluid communication with the deoxygenation catalyst bed wherein at least one of the adsorption beds selectively adsorbs water and carbon dioxide upon contact with the impure argon stream; a cryogenic temperature separation apparatus that is in fluid communication with the plurality of adsorption beds and that separates the impure argon stream into a partially purified argon stream comprising oxygen, carbon monoxide, and hydrogen impurities and an effluent stream comprising nitrogen, hydrocarbons, and hydrogen; and a plurality of metal catalyst beds that are in fluid communication with the cryogenic temperature separation apparatus and wherein at one of the metal catalyst beds removes the hydrogen, carbon monoxide, and oxygen impurities from the partially purified argon stream and provides the purified argon product.

In yet another embodiment of the present invention, there is provided a method for the purification of argon comprising the following steps: providing an impure argon stream comprising oxygen, nitrogen, carbon monoxide, carbon dioxide, water, and hydrocarbons; contacting the impure argon stream with a deoxygenation catalyst to substantially remove the oxygen contained therein; contacting the impure argon stream with one of a plurality of adsorbent beds to selectively adsorb carbon dioxide and water from the impure argon stream; separating the impure argon stream in a cryogenic temperature separation apparatus to provide a partially purified argon stream comprising oxygen, carbon monoxide, and hydrogen impurities and an effluent stream comprising nitrogen, hydrocarbons, and hydrogen; and passing the partially purified argon stream comprising oxygen, carbon monoxide, and hydrogen impurities through one of a plurality of metal catalyst beds to remove the impurities and provide a purified argon product wherein the passing step is conducted at an ambient temperature.

These and other aspects of the invention will become apparent from the following detailed description.

DETAILED DESCRIPTION OF THE INVENTION

The present invention is directed to a process for the recovery, purification, and recycle of argon and a system incorporating same. The system and process of the present invention can produce a high purity argon product, i.e., about 1 ppb or less of impurities. Earlier processes in the art may use cryogenic distillation or cryogenic adsorption to remove nitrogen, hydrogen, hydrocarbons, oxygen, and carbon monoxide impurities from the argon stream. These processes may operate at very low temperatures, require highly insulated vessels, and incur substantial operating costs and capital costs. By contrast, the present invention uses, inter alia, a plurality of metal catalyst beds operated at ambient temperature to remove hydrogen, oxygen, and carbon monoxide impurities from the impure argon stream. The impure argon is passed through smaller cryogenic separation apparatuses thereby reducing the refrigeration requirements. The present invention also allows for ready regeneration of the system elements to optimize the recovery of the purified argon product by minimizing argon loss.

The term "ambient temperature", as used herein, relates to one or more temperatures that range from −30° C. to 50° C.

The term "cryogenic temperature", as used herein, relates to one or more temperatures that are −50° C. or below.

The term "catalytic" or "catalyst", as used herein, relates to a material which under certain conditions of temperature and/or pressure increases the rate of specific chemical reactions or acts as a chemisorbent for specific components of the feed stream.

The term "adsorption", as used herein, relates to process, which may be reversible whereby certain components of a mixture adhere to the surface of solid bodies that it contacts.

The term "stream", as used herein, relates to a flowing fluid composed of a gas, liquid, suspended solids, or combinations thereof.

FIG. 1 provides an illustration of one embodiment of the vessel of the present invention. As FIG. 1 illustrates, an impure argon effluent stream 10 is removed from a crystal furnace (not shown) where silicon crystals are grown using, for example, the Czochralski process. The temperature of argon stream 10 may be at a temperature below that of the crystal furnace temperature. The argon stream 10 may contain trace levels, or several hundreds of ppm, of hydrogen, oxygen, nitrogen, carbon monoxide, carbon dioxide, hydrocarbons, dopants, and/or particulate impurities.

In certain preferred embodiments such as the embodiment shown in FIG. 1, argon stream 10 may be combined with a recycle stream 23 to form a combined, impure argon stream 11. Typically, combined argon stream 11 may contain about 5% or less of the flow of recycle stream 23. Recycle stream 23 is a product of the regeneration of the metal catalyst beds 8a or 8b in later steps of the process. The regeneration of metal catalyst beds 8a and 8b requires a purge gas such as hydrogen-containing stream 21 and a portion of the purified argon product. The effluent of the regeneration step, or recycle stream 23, may be purified along with argon stream 10 in combined argon stream 11 to optimize the recovery of purified argon from the process. Further, any unreacted hydrogen within the recycle stream 23, once combined with argon stream 10 into stream 11, may be used to facilitate oxygen removal in deoxogenation catalyst bed 5.

Argon stream 11 is passed through compressor 1. Compressor 1 compresses stream 11 thereby raising the pressure of the stream to a range from between about 80 to about 200 psig. The pressure stream 11 is set in accordance with the most suitable operating conditions of the subsequent downstream process steps. The compressed argon stream is then cooled in heat exchanger 2 to ambient temperature.

Referring again to FIG. 1, the cooled, compressed argon stream is fed to scrubber 3 to remove dopants, such as, for example, oxides and hydrides of arsenic, phosphorous, antimony, gallium and boron, and particulates such as silicon dioxides, from the impure argon stream to provide a substantially dopant-free impure argon stream 12. Scrubber 3 may be a liquid scrubber or absorbent that uses various caustic solutions, solvents, or liquid scrubbing agents such as, but not limited to, aqueous sodium or potassium hydroxide. In alternative embodiments, scrubber 3 may comprise a bed of one or more adsorbent materials such as an impregnated carbon manufactured by Purafil, Inc. of Dorville, Ga.

After the argon stream is substantially free of dopant and particulate impurities, impure argon stream 12 is heated to a temperature that ranges from about 120° C. to about 250° C. by a heat source such as gas heater 4. The heated, impure argon stream then contacts a deoxogenation ("deoxo") catalyst 5, such as a bed of a metal catalyst palladium, platinum, or mixtures thereof to provide a deoxygenated impure argon stream 16. In certain preferred embodiments, supplemental hydrogen 15 may be optionally added to the argon stream 12, in a quantity in excess of a stoichiometric amount, prior to contacting the deoxo catalyst to facilitate the reaction. Supplemental hydrogen gas 15 may be provided by an external source. It is believed that the majority of the oxygen and hydrogen within impure argon stream 12 is converted to water. The oxygen concentration of the deoxygenated, impure argon stream 16, after contacting deoxo catalyst bed 5, may be reduced to about 1 ppm or less. Further, it is believed that the carbon monoxide within impure argon stream 12 may be partially converted to carbon dioxide.

Deoxygenated, impure argon stream 16 contacts an adsorbent to selectively adsorb any water or carbon dioxide contained therein. This process may be conducted using a pressure swing adsorption, a thermal swing adsorption, or vacuum swing adsorption system. In certain preferred embodiments, stream 16 may be fed into a thermal swing adsorption system 6 such as that shown in FIG. 1 to remove water and carbon dioxide impurities to provide a substantially dry, i.e., about 0.010 ppm or less residual water, and substantially carbon dioxide-free, i.e., about 0.020 ppm or less carbon dioxide, impure argon stream 17.

As FIG. 1 shows, thermal swing adsorption system 6 may contain at least two adsorbent beds such as adsorbent beds 6a and 6b. Adsorbent beds 6a and 6b contain any standard adsorbents suitable to selectively adsorb carbon dioxide and water such as 13X-zeolite, 5A-zeolite, or 4A-zeolite and mixtures thereof. Stream 16 enters either bed 6a or 6b at ambient temperature. After contacting adsorbent beds 6a or 6b, a portion of the dry, carbon dioxide-free argon stream 17 is separated into a side stream 18. Side stream 18 is heated via a heat source such as gas heater 9 to a temperature that ranges from about 150° C. to about 350° C. to regenerate either adsorbent beds 6a or 6b. In certain preferred embodiments, more than one adsorbent bed 6a or 6b is used to selectively adsorb carbon dioxide and water from argon stream 16 while the other adsorbent bed is being regenerated via side stream 18 to allow for continous processing. Effluent 13 from the regeneration of at least one of adsorbent beds 6a or 6b may contain carbon dioxide, water, and minor argon losses.

The remainder of the argon stream 17 is passed through a heat exchanger 14 such as a chiller to reduce the temperature of argon stream 17 to a cryogenic temperature. The argon stream is then passed a cryogenic separation apparatus such as cryogenic distillation column 7. Cryogenic distillation column 7 separates incoming argon stream 17 into a plurality of outgoing streams, such as partially purified argon stream 19 and effluent stream 20, depending upon the relative boiling points of the components contained therein. Impurities such as nitrogen, a portion of the hydrogen, and the hydrocarbon accumulate in the top portion of distillation column 7 forming effluent stream 20; partially purified argon stream 19, which contains about 5 ppm or less of carbon monoxide, oxygen, and hydrogen impurities along with the remaining argon, accumulates in the bottom portion of distillation column 7. Effluent stream 20 is discharged out of the system through an effluent vent (not shown).

Partially purified argon stream 19 may be warmed to ambient temperature by a heat source such as optional gas heater 24 prior to contacting one of a plurality of metal catalyst beds 8a or 8b. In certain preferred embodiments such as that shown in FIG. 1, streams 19 and/or 20 may be redirected to heat exchanger 14 to recover the refrigeration prior to being directed to optional heater 24 and effluent vent, respectively. Metal catalyst beds 8a and 8b are operated at ambient temperature for the final purification of argon stream 19. More than one metal catalyst bed is used to allow for continuous processing of argon; one bed may contact stream 19 while the other bed is being regenerated. Metal catalyst beds 8a and 8b may be a permeable aggregate of pelletized solid particles of a metal that acts like a catalyst such as nickel, platinum, palladium, rhodium or combinations thereof that are contained within a vessel. In certain preferred embodiments such as the embodiment shown in FIG. 1, metal catalyst beds 8a and 8b comprise nickel. Alternatively, metal catalyst beds 8a and 8b may comprise a high surface area, metal catalyst substrate such as a metal mesh or gauze or a high surface area substrate, such as an inorganic material, substantially coated with a metal catalyst material. In these embodiments, the substrate may have a surface area that ranges from about 100 to about 2,500 $m^2/g$. The metal catalyst within the beds remove the remaining hydrogen, oxygen and carbon monoxide impurities from the argon stream to produce the purified argon product 22. Stream 19 contacts metal catalyst bed 8a or 8b for a time prior to the elution of the impurities on the catalyst. The purified argon product 22 contains about 1 ppb or less of impurities.

In certain preferred embodiments, one of the metal catalyst beds 8a or 8b is used for the final purification of the argon stream while the other metal catalyst bed is being regenerated. Metal catalyst beds 8a or 8b can be regenerated in the following method: 1) catalyst bed 8a or 8b, which is not used for the final purification of the argon stream 19, is heated using a heat source such as gas heater 25 with a portion of the purified argon product stream 22 to a temperature range from between about 120° C. to about 260° C.; 2) a hydrogen-containing gas stream, such as 1% hydrogen in argon (see stream 21 in FIG. 1), is passed through the heated catalyst bed; 3) the heated catalyst bed is purged with a stream of purified argon 22 to form recycle stream 23; and 4) the heated catalyst bed is cooled to ambient temperature under a stream of purified argon 22. When the outlet of metal catalyst beds 8a or 8b reaches the desired desorption temperature, a small amount of hydrogen gas may be added to the regeneration stream to aid in the regeneration of the chemisorbent. During the second step of the regeneration sequence, any oxygen and carbon monoxide present within the metal catalyst bed 8a or 8b reacts with hydrogen within the hydrogen-containing stream and is removed as water, hydrocarbon, and/or carbon oxides. The third step of the regeneration method removes any remaining hydrogen contained within metal catalyst beds 8a or 8b. In certain preferred embodiments such as that depicted in FIG. 1, hydrogen-containing stream 21 is turned off before heater 25 is de-energized so that the catalyst is not cooled under a hydrogen atmosphere.

As mentioned previously, the product from the regeneration step, or recycle stream 23, may be recycled through the process to reduce the loss of purified argon during the regeneration of the metal catalyst beds. Recycle stream 23 may contain the unreacted hydrogen from the catalyst regeneration cycle and the reaction products, such as water, hydrocarbons, and/or carbon oxides, during regeneration. The unreacted hydrogen can be isolated and used to react with oxygen in the deoxoygenation catalyst bed 5. The reaction products, such as the unreacted hydrogen, may be isolated via adsorption and/or distillation columns.

The embodiment depicted in FIG. 1 may employ a plurality of adsorbent beds 6a and 6b and metal catalyst beds 8a and 8b to allow one bed to clean the impure argon stream while the other bed undergoes regeneration. In one embodiment, the beds are being regenerated by use of a regeneration stream such as, for example, side stream 18 for adsorption beds 6a and b and hydrogen containing stream 21 and a portion of purified argon product 22 for metal catalyst beds 8a and b. The regeneration stream can be warmed by a heat source such as gas heater 9 and gas heater 25, respectively. The regeneration stream flows counter-concurrently to the flow of the stream during adsorption. Once beds 6a, 6b, 8a, or 8b have been regenerated, the beds can then be switched into adsorption service. The total time need to regenerate adsorbent beds 6a and 6b and the catalyst beds 8a and 8b are independent with respect to each other.

Portions of the purification and regeneration process of the present invention can be modified to recover, recycle and purify argon from other applications besides silicon crystal growth furnaces. In these processes, certain elements of the system may be eliminated depending upon the nature of the impurities of the impure argon stream. For example, the scrubber may be omitted if the incoming, impure argon stream does not include dopants.

While the invention has been described in detail and with reference to specific examples thereof, it will be apparent to one skilled in the art that various changes and modifications can be made therein without departing from the spirit and scope thereof.

What is claimed is:

1. A method for preparing a purified argon product from an impure argon stream, the method comprising:

providing the impure argon stream comprising oxygen, nitrogen, carbon monoxide, carbon dioxide, water, hydrocarbons, and dopants;

treating the impure argon stream to substantially remove the dopants contained therein;

contacting the impure argon stream with a deoxygenation catalyst to substantially remove the oxygen contained therein;

contacting the impure argon stream with one of a plurality of adsorbent beds to selectively adsorb carbon dioxide and water from the impure argon stream;

separating the impure argon stream in a cryogenic temperature separation apparatus to provide a partially purified argon stream comprising oxygen, carbon monoxide, and hydrogen impurities and an effluent stream comprising nitrogen, hydrocarbons, and hydrogen;

passing the partially purified argon stream comprising oxygen, carbon monoxide, and hydrogen impurities through one of a plurality of metal catalyst beds to remove the impurities and provide a purified argon product wherein the passing step is conducted at an ambient temperature heating at least one of the plurality of metal catalyst beds with a portion of the purified argon product to a temperature ranging from between about 120 to about 260° C. to provide at least one heated catalyst bed; passing a hydrogen-containing stream through at least one heated catalyst bed; purging the at least one heated catalyst bed with a portion of the purified argon product to provide a recycle stream; and cooling the at least one heated catalyst bed to ambient temperature.

2. The method of claim 1 wherein the recycle stream is combined with the impure argon stream in the providing step.

3. The method of claim 1 wherein at least a portion of the heating, second passing, purging, and cooling steps occur during the first passing step.

4. The method of claim 1 wherein the method further comprises the step of adding hydrogen prior to the first contacting step.

5. The method of claim 1 wherein the treating step further comprises contacting the impure argon stream with a liquid absorbent.

6. The method of claim 5 wherein the liquid absorbent is selected from the group consisting of sodium hydroxide, potassium hydroxide, and mixtures thereof.

7. The method of claim 1 wherein the the treating step further comprises contacting the impure argon stream with a solid adsorbent.

8. The method of claim 7 wherein the solid adsorbent comprises an impregnated carbon.

9. The method of claim 1 wherein the adsorbent bed in the second contacting step comprises a zeolitic adsorbent.

10. The method of claim 9 wherein the zeolitic adsorbent is selected from the group consisting of 13X-zeolite, 5A-zeolite, or 4A-zeolite and mixtures thereof.

11. The method of claim 1 wherein the amount of oxygen present in the impure argon stream after the second contacting step is reduced to 1 ppm of oxygen or less.

12. The method of claim 1 wherein at least one of the plurality of adsorbent beds in the second contacting step contacts the impure argon stream while the other bed is being regenerated with a portion of a substantially dry and substantially carbon-dioxide free, impure argon stream.

13. The method of claim 1 wherein the second contacting step comprises thermal swing adsorption.

14. A method for preparing a purified argon product from an impure argon stream, the method comprising:

provic the impure argon stream comprising oxygen, nitrogen, carbon monoxide, carbon dioxide, water, and hydrocarbons;

contacting the impure argon stream with a deoxygenation catalyst to substantially remove the oxygen contained therein;

contacting the impure argon stream with one of a plurality of adsorbent beds to selectively adsorb carbon dioxide and water from the impure argon stream;

separating the impure argon stream in a cryogenic temperature separation apparatus to provide a partially purified argon stream comprising oxygen, carbon monoxide, and hydrogen impurities and an effluent stream comprising nitrogen, hydrocarbons, and hydrogen; and passing the partially purified argon stream comprising oxygen, carbon monoxide, and hydrogen impurities through one of a plurality of metal catalyst beds to remove the impurities and provide a purified argon product wherein the passing step is conducted at an ambient temperature heating at least one of the plurality of metal catalyst beds with a portion of the purified argon product to a temperature ranging from between about 120 to about 260° C. to provide at least one heated catalyst bed; passing a hydrogen-containing stream through at least one heated catalyst bed; purging the at least one heated catalyst bed with a portion of the purified argon product to provide a recycle stream; and cooling the at least one heated catalyst bed to ambient temperature.

* * * * *